(12) United States Patent
Stenson

(10) Patent No.: US 9,456,182 B2
(45) Date of Patent: Sep. 27, 2016

(54) PIPELINE CLEANING SYSTEMS AND METHODS

(71) Applicant: Pure Software Solutions, Inc., Denver, CO (US)

(72) Inventor: William Stenson, Denver, CO (US)

( * ) Notice: Subject to any disclaimer, the term of this patent is extended or adjusted under 35 U.S.C. 154(b) by 309 days.

(21) Appl. No.: 13/772,259

(22) Filed: Feb. 20, 2013

(65) Prior Publication Data

US 2013/0215255 A1    Aug. 22, 2013

Related U.S. Application Data

(60) Provisional application No. 61/601,494, filed on Feb. 21, 2012.

(51) Int. Cl.
| | | |
|---|---|---|
| *H04B 7/26* | (2006.01) | |
| *B08B 3/02* | (2006.01) | |
| *B08B 9/04* | (2006.01) | |
| *B01D 45/00* | (2006.01) | |
| *H04N 7/18* | (2006.01) | |
| *F16L 55/18* | (2006.01) | |
| *B08B 9/049* | (2006.01) | |
| *F17D 5/00* | (2006.01) | |
| *E03F 7/12* | (2006.01) | |

(52) U.S. Cl.
CPC *H04N 7/18* (2013.01); *B08B 9/04* (2013.01); *B08B 9/0495* (2013.01); *F16L 55/18* (2013.01); *F17D 5/00* (2013.01); *E03F 7/12* (2013.01); *H04N 7/185* (2013.01)

(58) Field of Classification Search
CPC .......... H04N 7/18; B08B 3/02; G01C 21/30; G08G 1/123; E03F 7/12
See application file for complete search history.

(56) References Cited

U.S. PATENT DOCUMENTS

| | | | | |
|---|---|---|---|---|
| 5,341,539 A | * | 8/1994 | Sheppard et al. | 15/302 |
| 6,175,380 B1 | * | 1/2001 | Van Den Bosch | 348/84 |
| 7,246,009 B2 | * | 7/2007 | Hamblen et al. | 701/517 |
| 7,916,170 B2 | * | 3/2011 | Soltysik | 348/92 |
| 2002/0113870 A1 | * | 8/2002 | Mueckl et al. | 348/84 |
| 2008/0146158 A1 | * | 6/2008 | Pan et al. | 455/66.1 |

FOREIGN PATENT DOCUMENTS

JP    EP 0911452 A2 *    4/1999 ................ E03F 7/12

\* cited by examiner

*Primary Examiner* — Geepy Pe
*Assistant Examiner* — Patricia I Young

(57) ABSTRACT

A system can include a first vehicle operating a mobile pipeline cleaning device for cleaning a pipeline, a second vehicle operating a mobile camera device configured to enter said pipeline and capture video data corresponding to an interior of said pipeline, and a mobile video unit device. The second vehicle can have a transmitter configured to transmit the video data over a communication path, and the mobile video unit device can have a receiver configured to receive the video data from the transmitter over the communication path. The mobile video unit device can visually present to a user a video feed corresponding to the video data.

18 Claims, 2 Drawing Sheets

PIPELINE CLEANING SYSTEMS AND METHODS

CROSS-REFERENCE TO RELATED APPLICATION

This application claims the benefit of U.S. Provisional Application No. 61/601,494, filed Feb. 21, 2012 and titled PIPELINE CLEANING SYSTEMS AND METHODS, the content of which is hereby fully incorporated by reference herein.

TECHNICAL FIELD

The technical field of the disclosed technology generally pertains to systems and methods for the cleaning of pipelines.

SUMMARY

Embodiments of the disclosed technology generally include a mobile video display unit configured to be primarily used in connection with cleaning processes for wastewater and stormwater pipelines. The mobile video display unit may also be configured for use in connection with virtually any other process that requires or otherwise allows for remote video capabilities for visibility of a remote work area.

BACKGROUND

In the wastewater pipeline industry, pipeline cleaning is typically performed by way of a Sewer Cleaning Vehicle (SCV) operating in communication with a Closed Circuit Television (CCTV) van. The CCTV van operator may remotely operate an inspection tractor upon which a camera is mounted. The operator may control the inspection tractor as well as the camera mounted thereon to obtain visibility inside pipelines that are otherwise inaccessible or unsafe for a person to enter. While the CCTV van is usually situated over an access point (e.g., a manhole, inlet, etc.), the SCV may be situated remote from the CCTV van, e.g., at a distance up to—or greater than—1,000 feet from the CCTV van.

The SCV is typically equipped with a high-pressure water hose fitted with fixed debris-cutting equipment or cleaning nozzles that perform the actual cleaning within the pipeline. The SCV operator usually runs the hose at a high pressure, e.g., 2,000 psi, to clean the pipe and cut away debris. However, the SCV operator must do this without any visibility inside the pipeline. Indeed, it is the CCTV operator's responsibility to try to determine and communicate appropriate feedback and commands (e.g., "faster," "slower," "come ahead two feet," etc.) to the SCV operator by way of cellular phones, radios, hand signals, etc. Such systems are inefficient at best and completely ineffective at worst.

In these current systems, the SCV operator is operating blind in that he or she has no visibility of the pipeline in which he or she is operating the cleaning equipment. In addition to general ineffectiveness, these systems also subject the camera and inspection tractor to considerable and potentially significant risk. For example, if the SCV operator misunderstands a command from the CCTV van operator or makes even a small maladjustment, he or she can run the jet nozzle or cutting equipment right into the inspection tractor and/or camera. Such an incident can cause extensive damage to both pieces of equipment in addition to possibly damaging the pipe itself, which would likely be a very expensive mistake.

There remains a need for a way to address these and other problems associated with the prior art.

DETAILED DESCRIPTION

Figure 1:
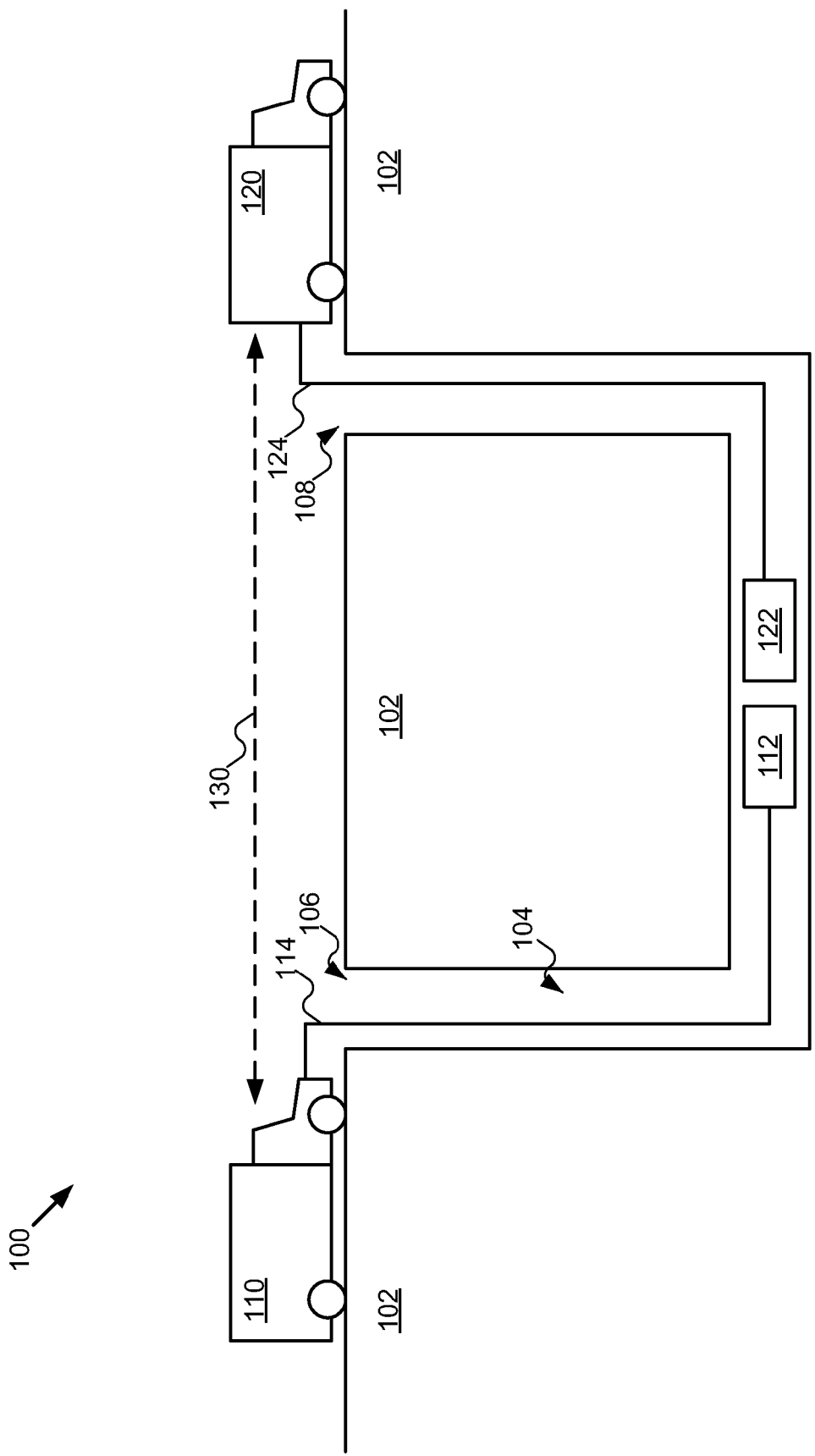
FIG. 1 illustrates an example of a pipeline cleaning system in accordance with certain embodiments of the disclosed technology.

FIG. 1 illustrates an example of a pipeline cleaning system 100 in accordance with certain embodiments of the disclosed technology. In the example, the pipeline cleaning system 100 includes a Sewer Cleaning Apparatus (SCA), such as a Sewer Cleaning Vehicle (SCV) 110, and a Closed Circuit Television (CCTV) van 120. In the example, the SCV 110 controls cleaning equipment 112, e.g., a high-pressure nozzle, by way of a connection 114 through an entry or access point 106, e.g., a manhole or other opening, into a pipeline 104 in the ground 102. The CCTV van 120 controls a mobile camera device 122 by way of a connection 124 through an entry or access point 108, e.g., a manhole or other opening, into the pipeline 104.

A transmitter at the CCTV van 120 may transmit information, e.g., a video signal generated from the mobile camera device 122 within the pipeline 104, over a communication path 130 that utilizes RF or digital technology to a receiving unit incorporated with or within a mobile video display unit at the SCV 110, for example. Such a mobile video display unit may be positioned or even mounted at a convenient location, e.g., at the operator's control station of the SCV 110. The mobile video display unit may be equipped with wireless audio/video communication capability, e.g., for communicating with the transmitter at the CCTV van 120 over the communication path 130.

While the mobile camera device 122 within the pipeline 104 may continue to be operated from the CCTV van 120, the operator of the SCV 110 may use a mobile video display unit to view the interior of the pipeline 104 while concurrently operating the cleaning equipment 112 within the pipeline 104. The video presented to the SCV 110 operator via the mobile video display unit may be at least substantially real-time. Users of the pipeline cleaning system 100 may experience substantial gains in productivity compared to current systems.

Figure 2:
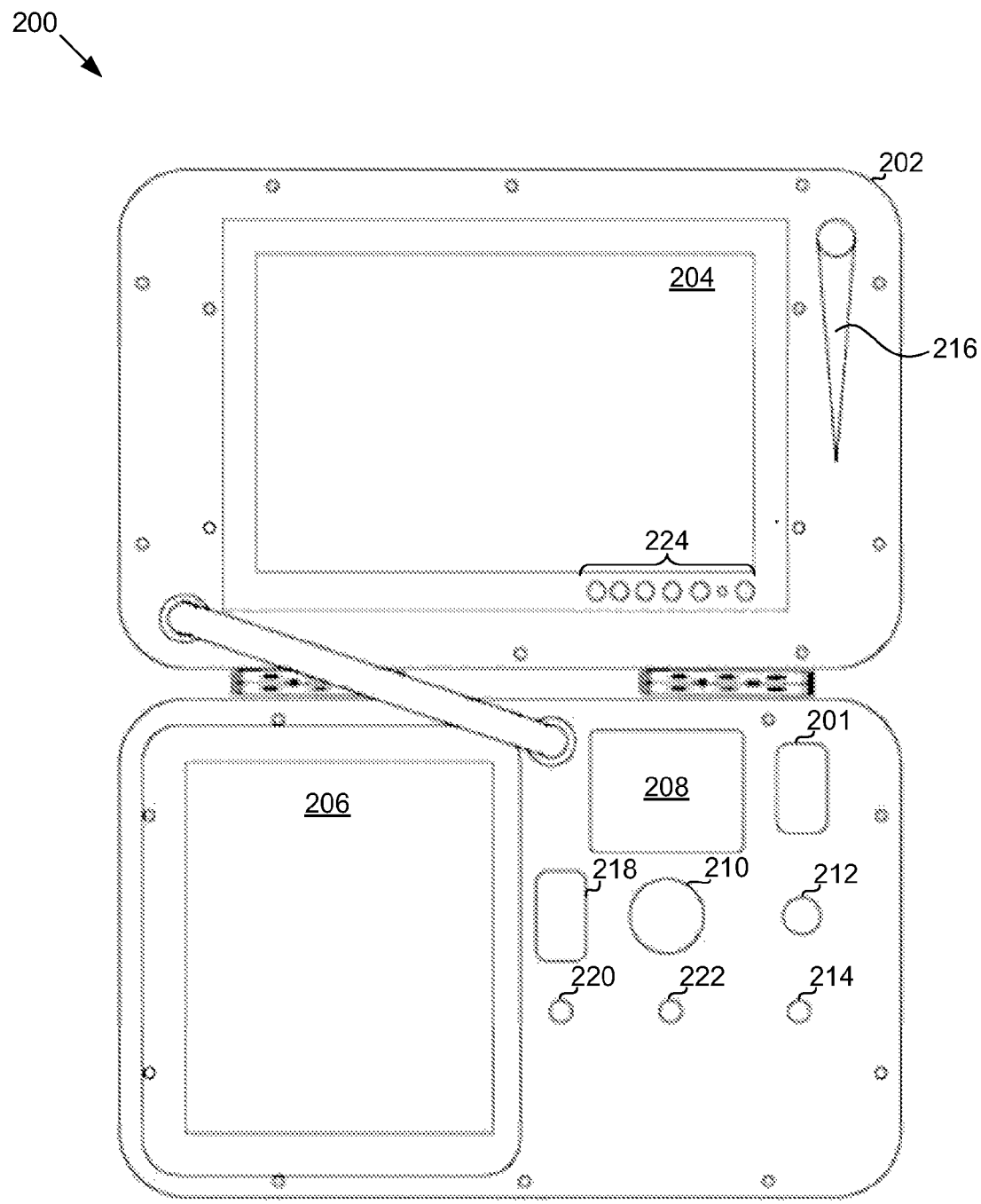
FIG. 2 illustrates an example of a mobile video display unit in accordance with certain embodiments of the disclosed technology.

FIG. 2 illustrates an example of a mobile video display unit 200 in accordance with embodiments of the disclosed technology. The mobile video display unit 200 may include an easily portable case 202, e.g., housing. In certain embodiments, the case 202 may be designed for outside use. For example, the case 202 may be rugged and generally water and/or weather resistant. The case 202 may also incorporate anti-glare features. In certain embodiments, the case 202 of the mobile video display unit 200 is made of rugged plastic.

In the example, the mobile video display unit 200 includes a monitor 204, e.g., a 7" or 10.4" backlit LCD screen, that may be housed by the case 202. The mobile video display unit 200 generally includes a power source, e.g., a 12-Volt power supply, that may be integrated with or otherwise stored within the case 202. The power source for the mobile video display unit 200 may be removable, rechargeable, or both. In certain embodiments, the mobile video display unit 200 may include overcharge protection circuitry configured to verify voltage before charging of the power supply, after charging thereof, or both.

The mobile video display unit 200 generally includes a transmitter unit and a receiver unit. Either or both of the transmitter and receiver units may be positioned, housed, or otherwise stored in a compartment 206, for example. Other items that may be stored in the compartment 206 include an AC adapter for either or both of the transmitter and receiver units, a video cable splitter, a video cable, and a battery charger. In the example, the mobile video display unit 200 also includes an antenna 216, e.g., a telescoping antenna, configured to receive signals from another device, e.g., at a CCTV van.

In the example, the mobile video display unit 200 includes a voltage meter 208, a power switch 201 for turning the mobile video display unit 200 on or off, a 12V power receptacle 210, a fuse 212, e.g., 3-Amp fuse, and an AC battery charge jack 214. In certain embodiments, the mobile video display unit 200 also includes a tripod mounting panel (not shown), e.g., to allow for the mobile video display unit 200 to be mounted on a tripod. The tripod mounting panel may be located at the bottom of the case 202, for example. Alternatively or in addition thereto the mobile video display unit 200 may have a handle (not shown), e.g., for easy carrying of the unit 200 by a user.

The mobile video display unit 200 may include an RCA video input 220 to receive one or more video signals from one or more external video sources. A video source selection switch 218 on the mobile video display unit 200 may be used by a user to switch between the internal video feed of the mobile video display unit 200 and the one or more video signals received from the one or more external video sources connected to the mobile video display unit 200 by way of the RCA video input 222. Alternatively or in addition thereto, the mobile video display unit 200 may include an RCA video output 222 to transmit a video signal to an external device. For example, a user may attach an external video monitor to the mobile video display unit 200 by way of the RCA video output 222.

One or more menu buttons 224 may be provided to offer a user a number of options with regard to operation of the monitor 204. For example, a Power On/Off button may allow a user to turn the monitor 204 on or off. A Menu button may cause the monitor 204 to present the user with a number of different menu options. A Select button and one or more scrolling buttons may be used in connection with the presented menu to enable the user to make his or her selections in the menu. Any or all of the menu buttons 224 may be used in connection with one or both of Viewing and Menu modes of the mobile video display unit 200.

In certain embodiments, an operator may view the monitor 204 of the mobile video display unit 200 from outside the case 202 by opening an optional cover that may also serve as further anti-glare protection to improve viewing of the monitor 204. The case 202 may be designed to allow for multiple viewing angles of the monitor 204. In certain embodiments, the transmitter unit may be built into its own easily-accessible compartment within the case 202 and may also be readily removable from the case 202, e.g., to be set up at a CCTV van for operation at the CCTV van. In certain embodiments, all of the components of the mobile video display unit 200 other than the transmitter unit may be contained permanently within the case.

Additional accessories may be utilized for specific needs. Such accessories may include, but are not limited to, a tripod, wired or wireless glasses or video helmet, additional monitors, a backpack, a wired or wireless microphone, wired or wireless headphones or speakers, and a 12-Volt power cord for use with certain receptacle such as automotive receptacles.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
a mobile pipeline cleaning device for cleaning a pipeline;
a high-pressure hose coupled to the mobile pipeline cleaning device;
a mobile camera device configured to enter the pipeline, point toward the mobile pipeline cleaning device within the pipeline, and capture video data of the mobile pipeline cleaning device operating within the pipeline;
a first vehicle to operate the mobile pipeline cleaning device from outside the pipeline, the first vehicle including a mobile video unit device;
a first connector to couple the first vehicle to the mobile pipeline cleaning device through a first access point of the pipeline;
a second vehicle to operate the mobile camera device from outside the pipeline and to receive the captured video data from the mobile camera device, the second vehicle being at a separate location from the first vehicle and comprising a transmitter to transmit the captured video data over a wireless communication path from the second vehicle to the mobile video unit device at the first vehicle;
a second connector to couple the second vehicle to the mobile camera device through a second access point of the pipeline, the second access point being separate from the first access point; and
the mobile video unit device comprising a receiver to receive the captured video data from the transmitter over the communication path, the mobile video unit device configured to visually present to an operator for the mobile pipeline cleaning device, at the first vehicle, a real-time video feed corresponding to the captured video data while the operator concurrently operates the mobile pipeline cleaning device.

2. The system of claim 1, wherein the mobile pipeline cleaning device comprises fixed debris-cutting equipment and high-pressure nozzles.

3. The system of claim 1, wherein said first vehicle comprises a Sewer Cleaning Vehicle (SCV).

4. The system of claim 1, wherein said second vehicle comprises a Closed Circuit Television (CCTV) vehicle.

5. The system of claim 1, wherein said wireless communication path comprises a radio frequency (RF) channel.

6. The system of claim 1, wherein said wireless communication path comprises a digital transmission channel.

7. The system of claim 1, wherein said mobile video unit device is further configured to store said video data.

8. A mobile video unit device, comprising:
   a portable case;
   a receiver unit housed within the portable case and configured to receive video data generated by a mobile camera device remote from said receiver unit, connected to a first vehicle through a first access point of the pipeline, and pointed toward a mobile pipeline cleaning device within a pipeline to be cleaned, said video data being of the mobile pipeline cleaning device operating inside the pipeline to be cleaned;
   a transmitter unit in communication with said receiver unit and configured to transmit the video data to the receiver unit; and
   a video display housed within the portable case and configured to visually present to an operator of the mobile pipeline cleaning device a real-time video feed corresponding to said video data of said mobile pipeline cleaning device within said interior of said pipeline while the operator concurrently operates the mobile pipeline cleaning device from a first vehicle connected to the mobile pipeline cleaning device through a first access point of the pipeline.

9. The mobile video unit device of claim 8, wherein said video display comprises a monitor.

10. The mobile video unit device of claim 9, wherein said monitor comprises a 10.4" backlit LCD screen.

11. The mobile video unit device of claim 8, wherein said portable case comprises a rugged, weather-resistant housing.

12. The mobile video unit device of claim 8, further comprising a compartment configured to store said transmitter unit within said portable case.

13. The mobile video unit device of claim 12, wherein said compartment is further configured to store said receiver unit.

14. The mobile video unit device of claim 8, further comprising at least one connection for facilitating transmission of said video feed to at least one external video device.

15. A method of providing video feedback to an operator of a mobile pipeline cleaning device, the method comprising:
   placing the mobile pipeline cleaning device inside a pipeline;
   coupling the mobile pipeline cleaning device to a first vehicle through a first access point of the pipeline;
   positioning a mobile camera device inside the pipeline to point toward the mobile pipeline cleaning device;
   coupling the mobile camera device to a second vehicle through a second access point of the pipeline, the second access point being separate from the first access point;
   capturing, with a mobile camera device, video data of the mobile pipeline cleaning device operating within the pipeline;
   transmitting the video data over a wireless communication path from a first vehicle to a second vehicle;
   receiving the video data at a mobile video unit device at the second vehicle; and
   visually presenting the video data in real time to the mobile pipeline cleaning device operator, while the operator concurrently operates the mobile pipeline cleaning device from the second vehicle.

16. The method of claim 15, in which the transmitting comprises transmitting the video data over a radio frequency (RF) channel.

17. The method of claim 15, in which the transmitting comprises transmitting the video data over a digital transmission channel.

18. The method of claim 15, further comprising storing the video data at the mobile video unit device.

\* \* \* \* \*